Dec. 20, 1966     O. BSCHORR     3,292,727
HIGH POWER SOUND GENERATOR FOR SONIC FATIGUE TESTING

Filed March 4, 1964     3 Sheets-Sheet 1

INVENTOR.
Oskar Bschorr

BY Michael J. Striker

INVENTOR
Oskar Bschorr
BY
Michael J. Striker
ATTORNEY

United States Patent Office 3,292,727
Patented Dec. 20, 1966

3,292,727
HIGH POWER SOUND GENERATOR FOR
SONIC FATIQUE TESTING
Oskar Bschorr, Munich, Germany, assignor to Messer-
schmitt A.G., Augsburg, Germany
Filed Mar. 4, 1964, Ser. No. 349,381
Claims priority, application Germany, May 6, 1963,
M 56,717
15 Claims. (Cl. 181—.5)

The present invention concerns a high power sound generator, particularly for carying out sonic fatigue testing.

Aircraft components and particularly components of jet aircrafts are exposed in operation to very heavy sound energies. It is therefore necessary and desirable to test components of such aircrafts in order to find out to what extent they are capable of withstanding sonic fatigue and to test e.g. electrical and hydraulic aircraft installations in order to find out to what extent they are capable of functioning properly in spite of heavy sound energies impinging thereon. For carrying out such tests it is known to use sound generators which are capable of furnishing corresponding large sound energies displaying a sound spectrum, equivalent to that produced by the power plant of an airplane, particularly by jet engines.

Various types of sound generators for these purposes are known. For instance, sonic fatigue tests are carried out by means of sirens or installations operated on the basis of air modulation. However, for operating such devices it is necessary to have available also an air compressor installation which entails considerable investments and which additionally is disadvantageous because the overall efficiency drops on account of the necessity of twice converting energy from one form into another. Sonic fatigue tests have been carried out also with the aid of large loudspeaker arrangements which are very well suited for closely imitating the sound produced by jet engines or the like, but which have a severely limited output capacity. Finally, also piston-type loudspeakers have been used for the above purpose. These devices have a satisfactory efficiency but are difficult to adjust to furnishing a desired frequency or frequency combination. In addition, these known types of piston-type loudspeakers have a sound producing piston which is operated by a motor via a crank shaft.

It can be seen that all the known and customary testing devices are comparatively unsatisfactory because of high investment costs, rather complicated structure and relatively unsatisfactory overall efficiency.

It is therefore one object of this invention to provide for a high power sound generator for sonic fatigue testing which is free of the disadvantages of known apparatus yet capable of producing very considerable sound output.

It is another object of this invention to provide for a generator of the type set forth which in spite of all its advantages is comparatively simple in structure and does not entail high investment cost.

It is still another object of this invention to provide for a generator as set forth which is simple to operate and entirely reliable in operation.

With above objects in mind the invention includes a high power sound generator for sonic fatigue testing, comprising, in combination, a trumpet-shaped sound tube means flared in forward direction, sound producing cylinder means communicating with the rear end of the sound tube means, sound producing piston means movable in axial direction in the cylinder means, and free piston motor means operatively connected with the sound producing piston means for imparting to the latter a reciprocating motion at a predeterminable frequency resulting in corresponding sound production.

It can be seen that basically the sound generator according to the invention comprises sound producing means which are operated directly by a free piston motor of more or less conventional type. The free piston motor may be operated in accordance with the Otto method, according to the diesel principle, or according to the fuel injection principle, however, in any case, the two stroke system is considered as the most advantageous one. For instance, in comparison with a piston loudspeaker driven by a crank shaft the advantage of the arrangement according to the invention resides in the much smaller and simpler and therefore less expensive structure. Additionally, the mechanical efficiency is greatly increased. Since in an arrangement according to the invention the masses of bodies to be moved is much smaller than in the known devices a regulation of the operation can be carried out with the arrangement according to the invention in a practically inertia-free manner. Consequently, even rapid variations of the sound frequency and amplitude can be imitated exactly and with an excellent acoustic efficiency.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

In the operation of a free piston motor type sound generator with the purpose of carrying out sonic fatigue tests the amplitude of the produced sound, its frequency and its frequency composition can be varied in accordance with the requirements of the tests by using mainly the conventional controls for varying the operation of the motor.

For instance, the amplitude of the sound output is effected by regulating at the energy input side of the arrangement, the fuel mixture supply qualitatively and/or quantitatively, while at the output side a corresponding and correlated adjustment of the acoustic impedance is to be provided. The impedance can be adjusted for instance by varying the frequency-determining effective length of the sound output tube of the arrangement.

The operative frequency of the motor and thus also of the sound producing piston or pistons can be effected also by quantitatively or qualitatively regulating the fuel mixture supply.

In addition, a very rapid and inertia-free frequency regulation can be effected by varying the moment of ignition in the Otto process or by changing the moment of fuel injection in the Diesel process. Advanced ignition or advanced injection results in an increase of the operating frequency.

An amplitude and frequency regulation is also possible by varying the stroke volume of the motor. Such a variation can be effected for instance by varying the distance between the two cylinders of a two-cylinder motor, or by providing for a variation of the volume of the cylinder portion in which compression takes place.

Since all the above mentioned means and ways for regulating the operation of a free piston motor are entirely conventional and well known to the art, a detailed description thereof has been omitted from the specification and drawings since these regulating devices do not constitute a part of this invention.

The frequency composition of the sound produced by an arrangement according to the invention can be influenced by the shape of flared or trumpet-shaped portions of the sound output tube. For instance, a plurality of interchangeable different trumpet-shaped tube portions may be provided so that different impedance characteristics of these different tube portions can be utilized as may be required. However, a variation of this characteristic during operation can be effected very conveniently by axially shifting a stream-lined internal regulator body within the sound tube or sound producing cylinder.

Figure 1:
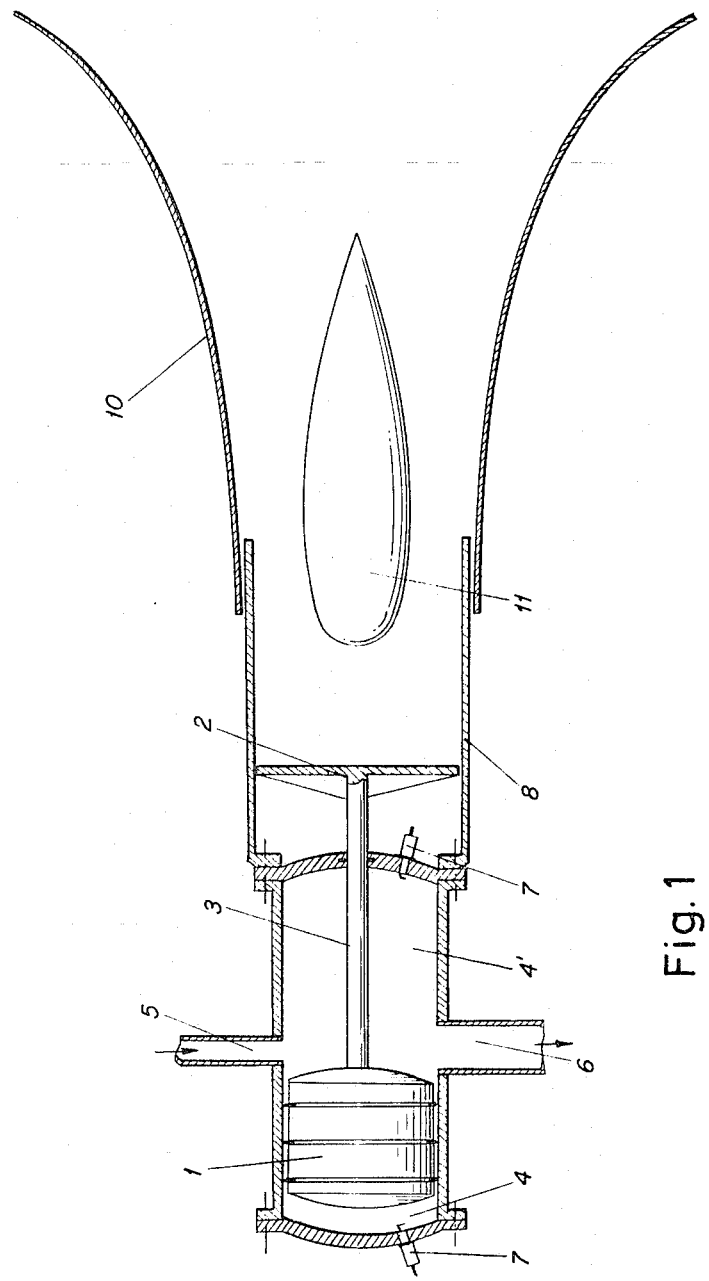
FIG. 1 is a diagrammatic axial section of a sound generator according to the invention including a free piston motor having a single cylinder and a single motor piston.

Referring now more specifically to the illustrated embodiments, it can be seen from FIG. 1 that the free piston motor comprises a single motor piston 1 axially movable within a cylinder having a rearward portion 4 and a forward portion 4'. The motor piston 1 is connected by a piston rod 3 with a sound producing piston 2 which is axially movable within a sound producing cylinder 8. In the cylinder portions 4 and 4' a fuel mixture is compressed by the piston 1 in one cylinder chamber while the piston moves in one direction and at the same time the fuel mixture is expanded after ignition in the other cylinder chamber, in a well known manner according to the two-stroke Otto process. The fuel mixture is introduced into the motor cylinder through the intake port 5 which is opened and closed by the piston 1 itself which in this respect acts like a valve. Depending upon the position of the piston 1 the fuel mixture is introduced either into the cylinder portion 4 or the cylinder portion 4'. The exhaust gases are in a similar manner permitted to escape through an exit or exhaust port 6. At each end of the cylinder housing of the motor an ignition plug 7 is provided. The piston rod 3 passes in a gas-tight manner through the forward cylinder end wall. The outer end of the piston rod 3 carries the sound producing piston 2. The sound producing cylinder 8 is open at its outer end and communicates therefore with the trumpet-shaped outwardly flared sound tube portion 10. In order to adjust the effective length of the sound tube the portion 10 may be adjusted telescopically as shown with respect to the sound producing cylinder 8. The adjustment or positioning of the portion 10 may be carried out by hand or by any suitable means not shown in the drawing. However, additionally a streamlined internal control body 11 may be arranged within the sound producing cylinder or the trumpet-shaped portion 10, so as to be axially adjustable by mechanical means not shown for the purpose of varying the impedance characteristic of the arrangement.

The operation of the above-described arrangement is as follows:

The sound producing piston 2 is reciprocatingly moved by the reciprocating motor piston 1. Consequently, the sound producing piston 2 produces in the sound producing cylinder 8 an oscillating air column. The adjustable trumpet-shaped tube portion 10 forming an extension of the cylinder 8 serves to increase the impedance of the sound production. The axial adjustment of the internal control member or body 11 serves to control the impedance structure. The space existing between the rear side of the sound producing piston 2 and the outside of the adjacent cylinder end wall has a volume which varies with the reciprocating movement of the sound piston 2 and may advantageously serve for producing scavenging or charging pressure in a manner similar to the well known system of crank case scavenging.

It will be understood if this arrangement is not operated in accordance with the Otto process but in the manner of the diesel method, the ignition or spark plugs 7 would be replaced by injection nozzles. Scavenging and charging would be carried out by pure air.

Figure 2:
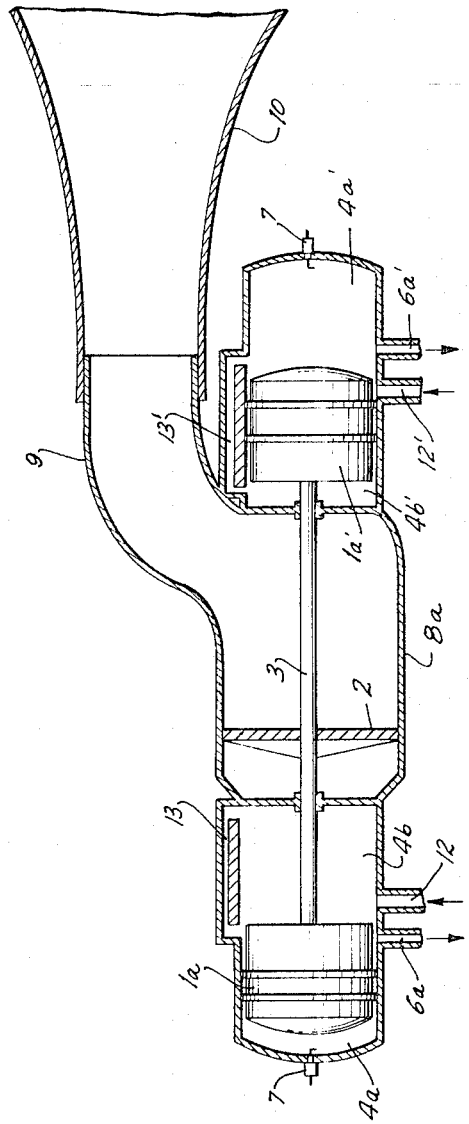
FIG. 2 is a smaller diagrammatic axial section of a second embodiment of the invention in which the free piston motor means comprise two separate cylinders, each with one piston.

The embodiment according to FIG. 2 differs from the embodiment according to FIG. 1 by the fact that the free piston motor comprises two separate cylinders and two separate pistons 1a and 1a'. The two pistons are connected with each other by a common piston rod 3 which carries also the sound producing piston 2 operating in the sound producing cylinder 8a. The piston 1a is operated in a cylinder comprising the cylinder portions 4a and 4b while the other piston 1a' operates in a cylinder comprising the chambers 4a' and 4b'. It is clear that both pistons 1a and 1a' operate synchronously i.e., always in the same direction. The cylinder chambers 4a and 4a' which are equipped with the ignition or spark plugs 7 serve for the combustion of the fuel mixture while the other chambers 4b and 4b' serve for the compression of a fuel mixture introduced through the intake ports 12 and 12', respectively. Through the movement of the motor pistons the fuel mixture is transferred from the chamber 4b or 4b', respectively, through a corresponding transfer duct 13 or 13', respectively, into the combustion chamber 4a or 4a', respectively. The ports 6a or 6a', respectively, take care of the exhaust. The sound producing cylinder 8a is connected by a curved sound duct 9 with the inner end of the axially adjustable trumpet-shaped sound tube portion 10. Again the means for adjusting the position of the tube portion 10 are not shown nor is shown in FIG. 2 the arrangement of a control body 11 within the sound tube arrangement. However, either one or both of these regulator means may be provided.

Figure 3:
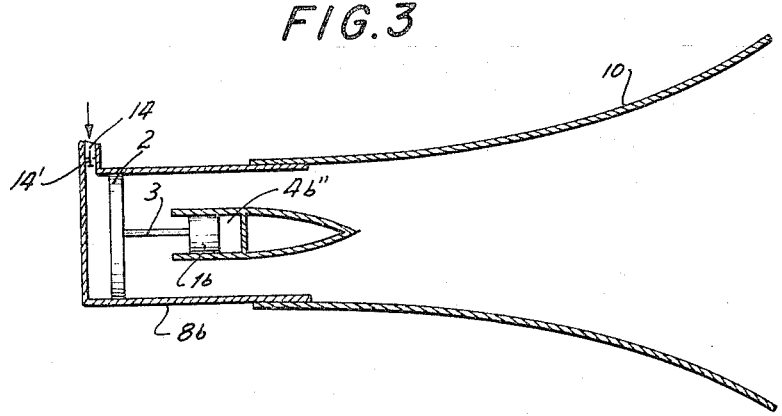
FIG. 3 is a diagrammatic axial section of another embodiment of the invention characterized by a single-cylinder motor and an air buffer within the sound producing cylinder.

The embodiment according to FIG. 3 is characterized by a single free piston motor cylinder 4b" with a single piston 1b, this motor arrangement having a comparatively small diameter and being arranged substantially concentrically within the sound producing cylinder 8b. The piston 1b is connected by piston rod 3 with the sound producing piston 2 operating in the above mentioned sound producing cylinder 8b however in such a manner that between the closed end of this sound producing cylinder 8b and the other side of the piston 2 a buffer space is provided. For the sake of simplicity of the illustration the means for introducing fuel and for taking care of the exhaust of the motor are not shown in FIG. 3. However, it is to be understood that the fuel combustion in the motor cylinder causes the piston 1b to move to the left as seen in FIG. 3 acting against the elastic resistance of the air buffer in the above mentioned buffer space. Consequently this compressed air buffer acts also as an energy storage so that during the operating stroke of the motor this air volume is compressed while in the next stroke the energy required for compressing the fuel mixture introduced into the motor cylinder is furnished by the expansion of the compressed air in the buffer space. Through a duct 14 with a valve 14' gas or air under a desired pressure may be introduced into the buffer space so as to adjust its normal pressure whereby the frequency of the motor operation can be adjusted. Also in this embodiment the tube portion 10 is axially adjustable by means not shown, and if desired a regulator body 11 may be arranged also within the tube portion 10.

Figure 4:
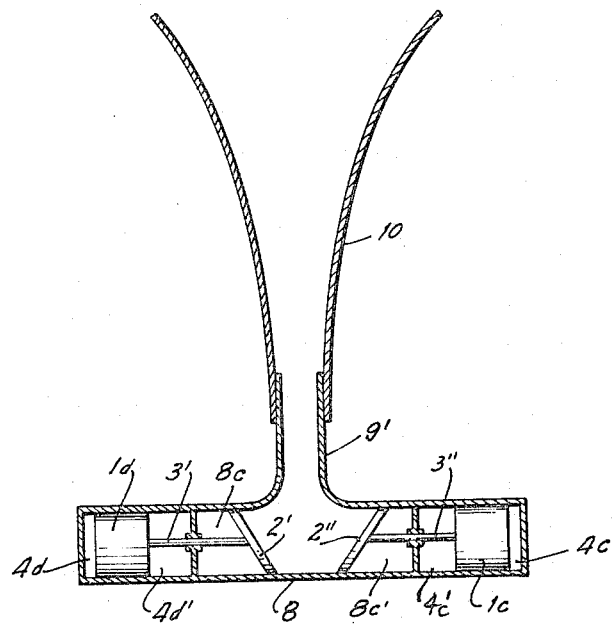
FIG. 4 is a diagrammatic axial section of still another embodiment of the invention, comprising two free piston motor arrangements operating preferably in phase opposition.

Finally, FIG. 4 illustrates an embodiment of the invention wherein the free piston motor arrangement incorporated therein can be operated in a completely dynamically balanced manner. In this embodiment the arrangement comprises two sound producing cylinders 8c and 8c' arranged opposite each other preferably coaxially as illustrated. The axis of each of these sound producing cylinders is oriented transverse of the sound tube 9' and of the extension thereof, the trumpet-shaped sound tube portion 10. In axial alignment with each of the sound producing cylinders is a free piston motor cylinder. In the sound producing cylinder 8c a sound producing piston 2' is axially movable and connected by piston rod 3' with the motor piston 1d axially movable reciprocatingly in a cylinder comprising the chambers 4d and 4d'. Similarly, in the other sound producing cylinder 8c' a sound producing piston 2" operates axially and is connected by a piston rod 3" with a motor piston 1c reciprocatingly movable in its cylinder comprising the chambers 4c and 4c'. The operation of this arrangement is analogous to the ones described above, except that preferably the operation is so provided that the cylinders 1c and 1d operate in phase opposition. Preferably the two sound producing pistons 2' and 2" are oriented as illustrated at an angle different from 90° with respect to the axis of the respective sound producing cylinder. In this manner the efficiency of the production of oscillations in the air column contained in the sound tube means 9' and 10 is increased. Also in this embodiment the trumpet-shaped outer portion of the sound tube means 10 may be axially adjustable by means not shown and additionally there may be a control body 11 arranged axially adjustable within the sound tube 9' or the outer portion 10.

It will be understood that each of the elements described above, or two or more together, may also find a useful application in other types of a high power sound generator for sonic fatigue testing differing from the types described above.

While the invention has been illustrated and described as embodied in a high power sound generator for sonic fatigue testing including three piston motor means, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that from the standpoint of prior art, fairly constitute essential characeristics of the generic or specific aspects of this invention and, therefore, such adaptations should and are intended to be comprehended within the meaning and range of equivalence of the following claims.

What is claimed as new and desired to be secured by Letters Patent is:

1. A high power sound generator for sonic fatigue testing, comprising, in combination, a trumpet-shaped sound tube means flared in forward direction and including an axially adjustable streamlined regulator body for varying the impedance characteristic of said sound tube means; said streamlined regulator body having a smoothly curved convex end facing away from the open forward end and facing toward the rear end of said trumpet-shaped sound tube; sound producing cylinder means communicating with the rear end of said sound tube means; sound producing piston means movable in axial direction in said cylinder means; free piston motor means operatively connected with said sound producing piston means for imparting to the latter a reciprocating motion at a predeterminable frequency resulting in corresponding sound production; and means cooperating with said free piston motor means for regulating the amplitude and frequency of the latter.

2. A high power sound generator for sonic fatigue testing, comprising, in combination, a trumpet-shaped sound tube means flared in forward direction, and including an axially adjustable streamlined regulator body for varying the impedance characteristic of said sound tube means; said streamlined regulator body having a smoothly curved convex end facing away from the open forward end and facing toward the rear end of said trumpet-shaped sound tube; sound producing cylinder means communicating with the rear end of said sound tube means; sound producing piston means movable in axial direction in said cylinder means; free piston motor means including a single cylinder and a single motor piston movable reciprocatingly therein, and a piston rod connecting said motor piston with said sound producing piston means for imparting to the latter a reciprocating motion at a predeterminable frequency resulting in corresponding sound production; and means cooperating with said free piston motor means for regulating the amplitude and frequency of the latter.

3. A high power sound generator for sonic fatigue testing, comprising, in combination, a trumpet-shaped sound tube means flared in forward direction, and including an axially adjustable streamlined regulator body for varying the impedance characteristic of said sound tube means; said streamlined regulator body having a smoothly curved convex end facing away from the open forward end and facing toward the rear end of said trumpet-shaped sound tube; sound producing cylinder means communicating with the rear end of said sound tube means; sound producing piston means movable in axial direction in said cylinder means; free piston motor means including two cylinders in axial alignment and in each cylinder a motor piston equidirectionally movable therein, and a piston rod connecting said two motor pistons with each other and with said sound producing piston means for imparting to the latter a reciprocating motion at a predeterminable frequency resulting in corresponding sound production; and means cooperating with said free piston motor means for regulating the amplitude and frequency of the latter.

4. A high power sound generator for sonic fatigue testing, comprising, in combination, a trumpet-shaped sound tube means flared in forward direction and including an axially adjustable streamlined regulator body for varying the impedance characteristic of said sound tube means; said streamlined regulator body having a smoothly curved convex end facing away from the open forward end and facing toward the rear end of said trumpet-shaped sound tube; sound producing cylinder means communicating with the rear end of said sound tube means, and including two sound producing cylinders arranged with their axes oriented transverse of said sound tube means; two sound producing pistons movable in axial direction in said cylinder means, respectively; free piston motor means including a first cylinder and a first motor piston moving reciprocatingly therein, and a second cylinder and a second motor piston reciprocatingly movable in the latter, each of said motor pistons operatively connected with a different one of said sound producing pistons for imparting to the latter a reciprocating motion at a predeterminable frequency resulting in corresponding sound production; and means cooperating with said free piston motor means for regulating the amplitude and frequency of the latter.

5. A high power sound generator for sonic fatigue testing, comprising, in combination, a trumpet-shaped sound tube means flared in forward direction and including an axially adjustable streamlined regulator body for varying the impedance characteristic of said sound tube means; said streamlined regulator body having a smoothly curved convex end facing away from the open forward end and facing toward the rear end of said trumpet-shaped sound tube; sound producing cylinder means communicating with the rear end of said sound tube means and including two sound producing cylinders arranged opposite to each other with their axes oriented transverse of said sound tube means; two sound producing pistons movable in axial direction in said cylinder means, respectively; free piston motor means including a first cylinder and a first motor piston moving reciprocatingly therein, and a second cylinder and a second motor piston reciprocatingly movable in the latter, each of said motor pistons operatively connected with a different one of said sound producing pistons for imparting to the latter a reciprocating motion in phase opposition to each other at a predeterminable frequency resulting in corresponding sound production; and means cooperating with said free piston motor means for regulating the amplitude and frequency of the latter.

6. A high power sound generator for sonic fatigue testing, comprising, in combination, a trumpet-shaped sound tube means flared in forward direction, having an adjustable frequency-determining effective length and including an axially adjustable streamlined regulator body for varying the impedance characteristic of said sound tube means; said streamlined regulator body having a smoothly curved convex end facing away from the open forward end and facing toward the rear end of said trumpet-shaped sound tube; sound producing cylinder means communicating with the rear end of said sound tube means; sound producing piston means movable in axial direction in said cylinder means; free piston motor means operatively connected with said sound producing piston means for imparting to the latter a reciprocating motion at a predeterminable frequency resulting in corresponding sound production; and means cooperating with said free piston motor means for regulating the amplitude and frequency of the latter.

7. A high power sound generator for sonic fatigue testing, comprising, in combination, a trumpet-shaped sound tube means flared in forward direction, having an adjustable frequency-determining effective length, and including an axially adjustable streamlined regulator body for varying the impedance characteristic of said sound tube means; said streamlined regulator body having a smoothly curved convex end facing away from the open forward end and facing toward the rear end of said trumpet-shaped sound tube; sound producing cylinder means communicating with the rear end of said sound tube means; sound producing piston means movable in axial direction in said cylinder means; free piston motor means including a single cylinder and a single motor piston movable reciprocatingly therein, and a piston rod connecting said motor piston with said sound producing piston means for imparting to the latter a reciprocating motion at a predeterminable frequency resulting in corresponding sound production; and means cooperating with said free piston motor means for regulating the amplitude and frequency of the latter.

8. A high power sound generator for sonic fatigue testing, comprising, in combination, a trumpet-shaped sound tube means flared in forward direction, having an adjustable frequency-determining effective length, and including an axially adjustable streamlined regulator body for varying the impedance characteristic of said sound tube means; said streamlined regulator body having a smoothly curved convex end facing away from the open forward end and facing toward the rear end of said trumpet-shaped sound tube; sound producing cylinder means communicating with the rear end of said sound tube means; sound producing piston means movable in axial direction in said cylinder means; free piston motor means including two cylinders in axial alignment and in each cylinder a motor piston equidirectionally movable therein, and a piston rod connecting said two motor pistons with each other and with said sound producing piston means for imparting to the latter a reciprocating motion at a predeterminable frequency resulting in corresponding sound production; and means cooperating with said free piston motor means for regulating the amplitude and frequency of the latter.

9. A high power sound generator for sonic fatigue testing, comprising, in combination, a trumpet-shaped sound tube means flared in forward direction, having an adjustable frequency-determining effective length, and including an axially adjustable streamlined regulator body for varying the impedance characteristic of said sound tube means; said streamlined regulator body having a smoothly curved convex end facing away from the open forward end and facing toward the rear end of said trumpet-shaped sound tube; sound producing cylinder means communicating with the rear end of said sound tube means and including two sound producing cylinders arranged with their axes oriented transverse of said sound tube means; two sound producing pistons movable in axial direction in said cylinder means, respectively; free piston motor means including a first cylinder and a first motor piston moving reciprocatingly therein, and a second cylinder and a second motor piston reciprocatingly movable in the latter, each of said motor pistons operatively connected with a different one of said sound producing pistons for imparting to the latter a reciprocating motion at a predeterminable frequency resulting in corresponding sound production; and means cooperating with said free piston motor means for regulating the amplitude and frequency of the latter.

10. A high power sound generator for sonic fatigue testing, comprising, in combination, a trumpet-shaped sound tube means flared in forward direction, having an adjustable frequency-determining effective length and including an axially adjustable streamlined regulator body for varying the impedance characteristic of said sound tube means; said streamlined regulator body having a smoothly curved convex end facing away from the open forward end and facing toward the rear end of said trumpet-shaped sound tube; sound producing cylinder means communicating with the rear end of said sound tube means and including two sound producing cylinders arranged opposite to each other with their axes oriented transverse of said sound tube means; two sound producing pistons movable in axial direction in said cylinder means, respectively; free piston motor means including a first cylinder and a first motor piston moving reciprocatingly therein, and a second cylinder and a second motor piston reciprocatingly movable in the latter, each of said motor pistons operatively connected with a different one of said sound producing pistons for imparting to the latter a reciprocating motion in phase opposition to each other at a predeterminable frequency resulting in corresponding sound production; and means cooperating with said free piston motor means for regulating the amplitude and frequency of the latter.

11. A high power sound generator for sonic fatigue testing, comprising, in combination, a trumpet-shaped sound tube means flared in forward direction; sound producing cylinder means closed at one end and communicating with the opposite end with the rear end of said sound tube means; sound producing piston means movable in axial direction in said cylinder means; and defining an air buffer chamber between itself and said closed end of said cylinder means; and free piston motor means having a diameter smaller than that of said sound producing cylinder means and mounted substantially concentrically within the latter, said motor means comprising a motor piston operatively connected with said sound producing piston means for imparting to the latter a reciprocating motion at a predeterminable frequency resulting in corresponding sound production.

12. A high power sound generator for sonic fatigue testing, comprising, in combination, a trumpet-shaped sound tube means flared in forward direction and having an adjustable frequency-determining effective length; sound producing cylinder means closed at one end and communicating at the opposite end with the rear end of said sound tube means; sound producing piston means movable in axial direction in said cylinder means and defining an air buffer chamber between itself and said closed end of said cylinder means; and free piston motor means having a diameter smaller than that of said sound producing cylinder means and mounted substantially concentrically within the latter, said motor means comprising a motor piston operatively connected with said sound producing piston means for imparting to the latter a reciprocating motion at a predeterminable frequency resulting in corresponding sound production.

13. A high power sound generator for sonic fatigue testing, comprising, in combination, a trumpet-shaped sound tube means flared in forward direction and including an axially adjustable streamlined regulator body for varying the impedance characteristic of said sound tube means; sound producing cylinder means closed at one end and communicating at the opposite end with the rear end of said sound tube means; sound producing piston means movable in axial direction in said cylinder means and defining an air buffer chamber between itself and said closed end of said cylinder means; and free piston motor means having a diameter smaller than that of said sound producing cylinder means and mounted substantially concentrically within the latter, said motor means comprising a motor piston operatively connected with said sound producing piston means for imparting to the latter a reciprocating motion at a predeterminable frequency resulting in corresponding sound production.

14. A high power sound generator for sonic fatigue testing, comprising, in combination, a trumpet-shaped sound tube means flared in forward direction, having an adjustable frequency-determining effective length, and including an axially adjustable streamlined regulator body for varying the impedance characteristic of said sound tube means; sound producing cylinder means closed at one end and communicating at the opposite end with the rear end of said sound tube means; sound producing piston means movable in axial direction in said cylinder means and defining an air buffer chamber between itself and said closed end of said cylinder means; and free piston motor means having a diameter smaller than that of said sound producing cylinder means and mounted substantially concentrically within the latter, said motor means comprising a motor piston operatively connected with said sound producing piston means for imparting to the latter a reciprocating motion at a predeterminable frequency resulting in corresponding sound production.

15. A high power sound generator for sonic fatigue testing, comprising, in combination, a trumpet-shaped sound tube means flared in forward direction; sound producing cylinder means communicating with the rear end of said sound tube means and including two coaxial sound producing cylinders arranged with their axes oriented transverse of said sound tube means; two sound producing pistons oriented at an angle different from 90° relative to the axis of said cylinder means and movable in axial direction in said cylinder means, respectively, said sound producing pistons having end faces facing each other and defining between themselves a free space communicating with said rear end of said sound tube; and free piston motor means including a first cylinder and a first motor piston moving reciprocatingly therein, and a second cylinder and a second motor piston reciprocatingly movable in the latter, each of said motor pistons operatively connected with a different one of said sound producing pistons for imparting to the latter a reciprocating motion at a predeterminable frequency resulting in corresponding sound production, said motor pistons being operated in phase opposition.

References Cited by the Examiner
UNITED STATES PATENTS

| | | | |
|---|---|---|---|
| 2,049,766 | 8/1936 | Glen | 181—.5 |
| 2,059,898 | 11/1936 | Osborne | 181—.5 |
| 2,546,965 | 4/1951 | Bodine | 60—35.6 |
| 3,056,104 | 9/1962 | De Kanski et al. | 181—.5 |

BENJAMIN A. BORCHELT, *Primary Examiner.*

W. KUJAWA, *Assistant Examiner.*